(12) United States Patent
Woodroffe et al.

(10) Patent No.: US 6,479,964 B2
(45) Date of Patent: Nov. 12, 2002

(54) POWER PACK FOR CORDLESS TOOLS AND ELECTRONICS

(75) Inventors: Jaime Woodroffe, North Reading, MA (US); David B. Stickler, Carlisle, MA (US)

(73) Assignee: Aerodyne Research, Inc., Billerica, MA (US)

( * ) Notice: Subject to any disclaimer, the term of this patent is extended or adjusted under 35 U.S.C. 154(b) by 0 days.

(21) Appl. No.: 09/775,906

(22) Filed: Feb. 2, 2001

(65) Prior Publication Data

US 2002/0113573 A1 Aug. 22, 2002

Related U.S. Application Data

(60) Provisional application No. 60/237,800, filed on Oct. 4, 2000.

(51) Int. Cl.[7] .............................. H02J 7/00; H02K 33/00
(52) U.S. Cl. .......................................... 320/115; 310/36
(58) Field of Search ............................ 320/115; 310/12, 310/13, 14, 36

(56) References Cited

U.S. PATENT DOCUMENTS

| | | | |
|---|---|---|---|
| 3,247,406 A | | 4/1966 | Toesca |
| 4,056,764 A | * | 11/1977 | Endo et al. .................. 318/139 |
| 4,989,573 A | | 2/1991 | Yokoyama et al. |
| 5,162,662 A | | 11/1992 | Nakayama |
| 5,555,853 A | * | 9/1996 | Bowen et al. ................. 123/2 |
| 6,283,808 B1 | * | 9/2001 | Lehmann ...................... 440/88 |
| 6,310,404 B1 | * | 10/2001 | Frank .......................... 290/1 A |
| 6,349,683 B1 | * | 2/2002 | Annen et al. ............. 123/46 E |

FOREIGN PATENT DOCUMENTS

| | | |
|---|---|---|
| DE | 4414067 A | 11/1994 |
| DE | 4414067 A | 10/1995 |
| FR | 2737819 A | 2/1997 |

OTHER PUBLICATIONS

Parviz Famouri et al., Design and Testing of a Novel Linear Alternator and Engine System for Remote Electrical Power Generation, Power Engineering Society 1999 Winter Meeting, IEEE New York, Jan. 31, 1999, pp. 108–112.

\* cited by examiner

*Primary Examiner*—Gregory J. Toatley, Jr.
(74) *Attorney, Agent, or Firm*—Cesari and McKenna, LLP; Edwin H. Paul, Esq.

(57) ABSTRACT

A portable self-contained power pack is described including a miniature internal combustion motor/alternator combination with an attached fuel supply. The electrical output from the motor/alternator is rectified and controlled to provide a DC output. The DC output is used to charge batteries and/or capacitors. The power pack is designed to be of a weight and size so that it may be carried while in use on the person of the user. The DC output and the batteries and/or capacitors are connected and power personal items. These personal items include, but are not limited to, cell phones, portable radios, laptops, stand alone computers, music and video players and recorders, personal electronic organizers, games and cordless power tools.

13 Claims, 8 Drawing Sheets

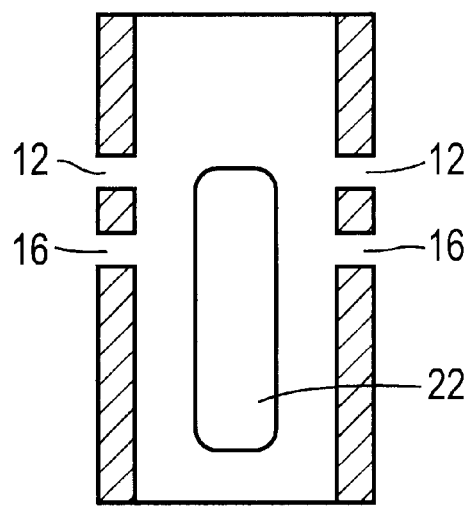
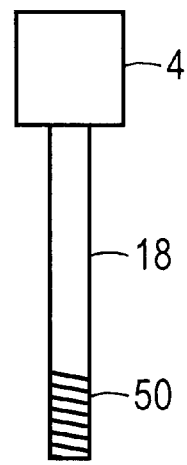
FIG. 3
FIG. 4
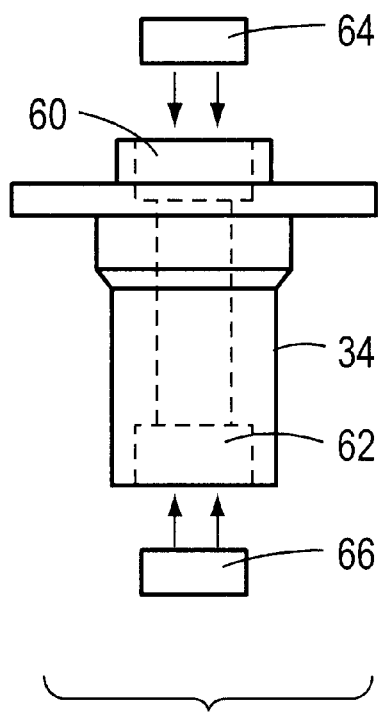
FIG. 5

POWER PACK FOR CORDLESS TOOLS AND ELECTRONICS

RELATED APPLICATIONS

The present application claims priority from U.S. Provisional Patent Application, entitled Power Pack for Cordless Tools, Ser. No. 60/237,800, which was filed on Oct. 4, 2000, of common ownership, and which application is hereby incorporated herein by reference. The present invention is also related to U.S. patent application Ser. No. 09/664,250 filed Sep. 18, 2000, now U.S. Pat. No. 6,349,683, of common assignment with the present invention, and which application is hereby incorporated herein by reference.

BACKGROUND OF THE INVENTION

1. Field of the Invention

The present invention relates to powering cordless or portable power tools and personal electronics including powering hand tools and electronics, and further including powering such tools and personal electronics items where the power pack and the item are carried on the person.

2. Background Information

Cordless power tools, electronics, and portable electronics that are carried on the person have become increasingly popular. Cell phones, portable radios, laptops, stand alone computers, music and video players and recorders, personal electronic organizers, games and cordless power tools (herein defined as personal items) are evident on the street, in the home, at work, at school—virtually in any environment and such items are being used by virtually all segments of the population. However, powering these portable items suffer from the types of power packs presently available. Basically, there are two different types of systems presently available. First, a battery (either rechargeable or not) assembly packaged with the item, secondly, a separate motor combined with a generator. Each of these approaches has limitations.

First, the battery packs for tools are heavy, have limited power, and short duration (in normal use, after one hour or so the battery pack needs to be removed and recharged). An example of a readily available battery pack for such items is the re-chargeable 19.2 volt battery pack from Panasonic that contains 3 amp-HR battery cell types. The pack is configured with 16 cells powering the tool and 16 on a battery charger. The weight of the 16 cells is about 1 Kg, the peak power ranges from about 200–400 watts, the total energy available is about 50 Watt-hours, and is typically used for about an hour before needing to be recharged.

Batteries contained in laptops and in music and video players are marginally acceptable depending on power requirements, while the batteries in personal organizers and games are commercially practical since these items at this time are power efficient. However, it is expected that as more complex games and more complex organizers with higher performance come on the market, increases in battery technology, including rechargeable batteries, will not keep up with the higher power for longer time periods that these new items are likely to require.

Second, fuel-powered generators for tools are heavy, noisy, not very portable, and therefore impractical in many applications. It is common in field construction to see a large generator on the ground and connected by a cord, often tens of feet long, to the tool. These generators are made up of two distinct components, a motor (to provide mechanical power) and an alternator coupled by a shaft to the motor, to convert the mechanical energy into electrical. However, the handyman homeowner will not purchase such systems for the incidental repairs around the house. These prior art generators are large because, that while the average power is not high (less than 50 watts), the peak power is many times larger while the tool is actually operating. Another prior art solution attaches a motor directly to the tool, for example a chain saw or lawn mower. But again, this arrangement is impractical for smaller tools, and it is out of the question for personal electronic items.

A possible third approach derives from automotive technology, where a engine generator charges batteries in a "hybrid" vehicle. However, such components (engine generator and batteries) are many hundreds of times larger than a tool or electronic item, and do not scale down well. This combination is not found in practice.

It is an object of the present invention to overcome the above limitations and provide a practical power pack for cordless power tools and personal electronics.

SUMMARY OF THE INVENTION

The objects set forth above, as well as further and other objects and advantages of the present invention, are achieved by the embodiments of the invention described hereinbelow.

A power pack is constructed with a fuel supply and an integrated motor/alternator that burns the fuel and supplies an electrical power output. That output is rectified and controlled to provide a direct current (DC) electrical output that provides power to both a load and to an energy storage assembly. That energy storage assembly is rechargeable batteries and/or capacitors in a preferred embodiment. The batteries and/or capacitors supply the peak power requirements of the load, and the integrated motor/generator provides the average power to the load and the storage assembly. A key enabler is a very small, light-weight generator made up of a fully-integrated motor and alternator and the recognition that this integrated motor /alternator could, in combination with energy storage, lead to a practical fuel-powered power pack with many advantages over existing ones.

In an embodiment the fuel supply and integrated motor/alternator may be formed as one or two modules connected by a fuel lineThe integrated motor/generator module may then be connected via an electrical cable to a second module containing the battery/capacitor pack and the electronics. The item being powered may be connected via another electrical cable to the second module. For example, the integrated motor/alternator may be placed on the floor, the electronics and batteries placed on a desk along side of a computer or game module that is being powered. In another embodiment, the fuel/integrated motor/generator and electronics/battery/capacitors are carried on a user's person while the item being powered may be an audio/video device worn on the head of the user. The audio device may be a cell phone or a player or some type of game device.

For a better understanding of the present invention together with other and further objects thereof, reference is made to the accompanying drawings and detailed descriptions, and its scope will be pointed out in the appended claims.

BRIEF DESCRIPTION OF THE DRAWINGS

The invention description below refers to the accompanying drawings, of which:

FIG. 3 is a section view of the cylinder;

FIG. 4 is a view of the piston and rod;

FIG. 5 is a side view of the sleeve and insert;

DETAILED DESCRIPTION OF AN ILLUSTRATIVE EMBODIMENT

This present invention in a preferred embodiment combines a miniature, light weight integrated motor and electric generator capable of generating the energy or the required average power over a long duration (8 hours) suitable for power tools. However, such a generator cannot provide the high peak power required, but when combined with a battery cell pack, the combination is suitable for powering tools. A commercial battery cell (Panasonic P-120SCPJ) has sufficient properties to make up a power pack in combination with a miniature integrated motor generator that meets all the requirements for a power pack.

The attached chart illustrates the specifications of the inventive generator/battery power pack compared to the Panasonic power pack described earlier. A preferred embodiment of the invention is labeled "miniature internal combustion engine/generator" or MICE.

PRIOR ART BATTERY PACK VS INVENTION

NiMH 19.2 V PACK (PANASONIC DATA)
    32 CELLS OF 3 AMP-HR TYPE (16 ON TOOL, 16 ON CHARGER) +CHARGER
    WEIGHT~16×60 GMS~1 KG
    PEAK POWER~10–20 A×17 V~200–400 W
    ENERGY~3 AMP-HR×17 V~50 W-HR
    DURATION IN USE~1 HR (50 WAVG POWER)
MICE+NiCd CELLS (PANASONIC)
    10 CELLS OF 1 AMP-HR TYPE (12V SYSTEM), NO CHARGER
    WEIGHT~10×39 GMS+100 GMS MICE+300 GM FUEL~0.8 KG
    PEAK POWER~30–50 A×10 V~300–500 W
    ENERGY~400 W-HR
    DURATION IN USE~8 HR

In the above comparison, notice that the peak power, energy and therefore the duration of use is significantly higher for the MICE which is an example of an embodiment of the present invention.

Figure 1A:
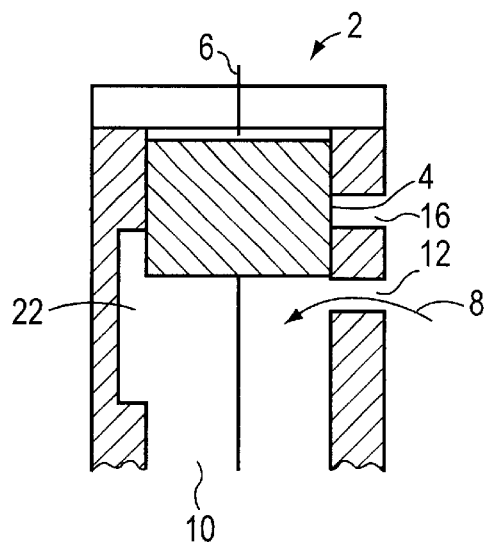
FIGS. 1a–1d are cylinder head/piston diagrams of a prior art basic two-cycle internal combustion engine.
Figure 1B:
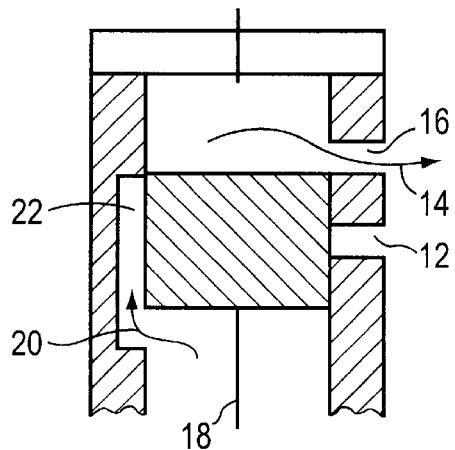
Figure 1C:
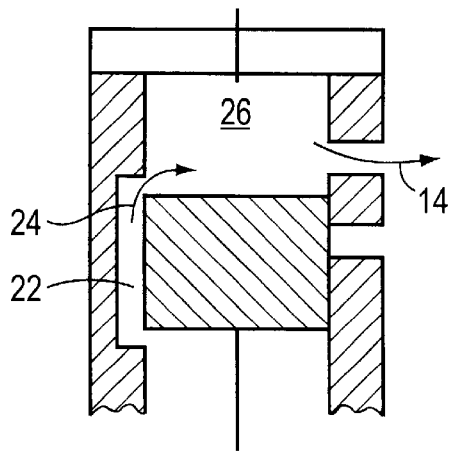

FIG. 1a shows the cylinder head 2 of a two-cycle engine with the piston 4 at the top of its stroke. A glow plug 6 provides the ignition source. When the piston moves toward the top of the stroke, fuel-vapor/air mixture 8 is drawn into the lower chamber 10 via an inlet port 12. FIG. 1b shows the piston just after ignition on the stroke that delivers power to the rod 18 attached to the piston. The combustion products 14 are ejected via an exhaust port 16, and the piston closes off the inlet port 12 and forces the fuel 20 in the lower chamber into the transfer port 22. FIG. 1c shows the fuel in the transfer port 22 entering 24 the upper cylinder chamber 26.

Figure 1D:
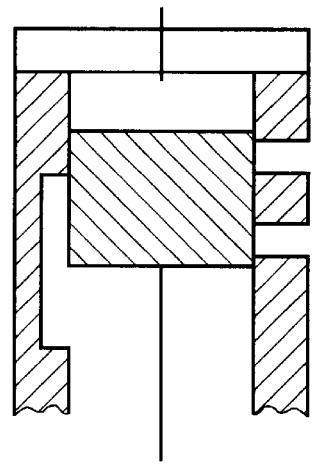

Referencing FIG. 1d, the fuel is being compressed ready for ignition in the upper chamber with the exhaust, and transfer ports closed off from the upper chamber.

Figure 2:
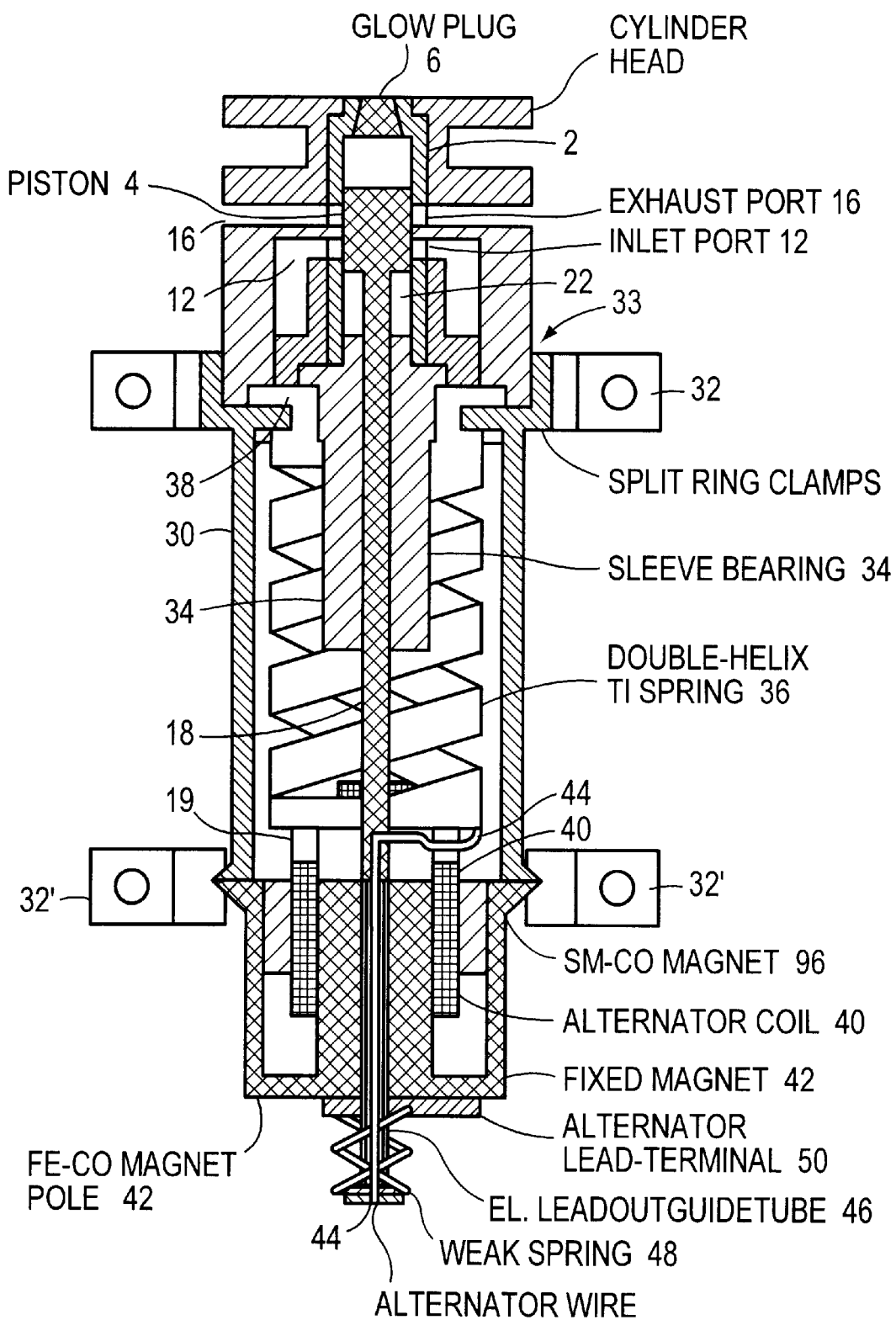
FIG. 2 is a partially sectioned view of a preferred illustrative embodiment of an integrated motor/generator suitable for use with in the present invention.

FIG. 2 is a cross section view of a completed example of the present invention. The upper section 2 shows the cylinder head that was described in general terms for FIGS. 1a–1d. Of note is that there are opposing exhaust ports 16, inlet ports 12, and transfer ports. The transfer port 22 is shown behind the piston/rod and the opposing transfer port is on the part of the cylinder wall taken away by the sectioned drawing. The cylinder head 2 is fixed securely to a housing 30 by split ring clamp 32. The rod 18 that extends axially from the piston 4 is guided by a sleeve 34 that is fitted securely to the cylinder head/housing and spring assembly. The sleeve is of aluminum preferably with an insert (not shown) made from Vespel® polyimide (DuPont trademark) or other like bearing material known in the art.

A one-piece spring 36 in this embodiment a machined spring with an integral end fitting 38 encircles the sleeve and rod. The spring is at least a double helix and is shown attached and secured to the housing where the housing and the cylinder head meet by the split ring clamp 32.

An alternator coil 40 in a preferred embodiment is attached via a standoff or standoffs 19 to the far end of the spring 36 and extends axially into the air gap of a fixed magnet 42. Alternatively, a coil of increased length could be attached directly to the spring. The operation is that as the piston reciprocates the coil follows, breaking the magnetic flux lines in the air gap and thereby generating electrical energy from the mechanical motion.

The lead 44 from the coil is insulated from the other conductive materials in the assembly and runs out the bottom of the assembly through a guide tube 46. At the bottom the lead 44 is electrically and mechanically attached to a weak spring 48 that is also insulated from the housing, etc. The other lead from the coil is electrically attached to the metallic spring and thereby to the housing and the other conductive portions if the assembly. The weak spring is also connected to a terminal 50 mechanically fixed to but electrically insulated from the housing, etc. The load connections are made to this terminal with the electrical return of the load connected to the housing or some other common connection terminal (not shown) electrically in contact with the housing and the spring. Of course other arrangements for bringing out the electrical leads from the moving coil can be made, including sliding connections as known in the art. Alternatively, one or both coil leads may be attached to one or both of the helices. The leads are attached along their entire length, using a flexible adhesive. Since the wire diameter will be much less than the cross-section of the helices, the wire and adhesive are highly compliant and therefore have minimal effect on the spring motion. This arrangement is advantageous in that it avoids the need for a guide tube and a weak spring, and reduces the risk of fatigue of the wire.

FIG. 3 is a sectioned side view of the cylinder 2 showing the opposing intake 12 and exhaust 16 ports and one of the opposing transfer ports 22. The preferred material is stainless steel.

FIG. 4 is a side view of the piston and axially extending rod, both preferably made of stainless steel. The rod ends with a threaded section 50 that allows the rod to be bolted to the spring, although there are other known ways to make this connection.

FIG. 5 is a side view of the sleeve bearing 34 with a sleeve insert bore at the top 60 and the bottom 62 arranged to accept the inserts 64 and 66. The sleeve is preferably aluminum and the inserts Vespel.

Figure 6:
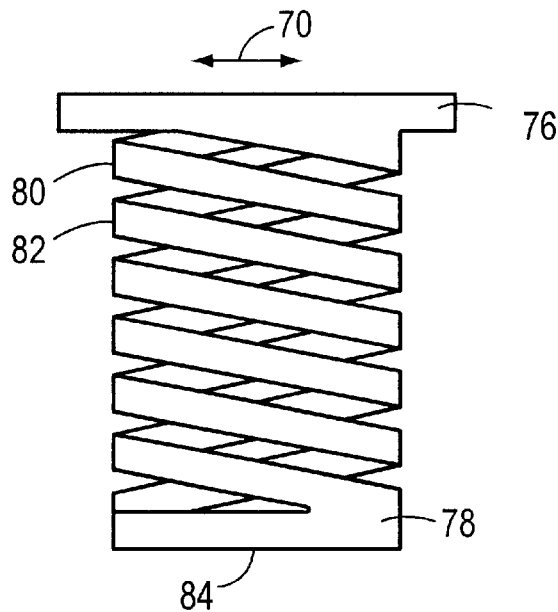
FIG. 6 is a side view of the helix spring.

FIG. 6 is a side view of the machined double helix spring. In a preferred embodiment, the diameter 70 of the main portion of the spring is about 1.1 centimeters and the shoulder about 1.2 centimeters. The total length of the spring including the shoulder 76 at the top and the bottom end 78 is about 1.8 centimeters. The double helix shows the opposing helixes 80 and 82. The pitch of each helixes, in a preferred embodiment, is about 0.6 centimeters. The end piece 78 is arranged with a tapped opening 82 that accepts the threaded end of the rod. In a preferred embodiment, the spring is machined from a single piece of a titanium alloy, but the spring may be formed by other methods as one piece.

The forming as or in one piece has an advantage in that the dimensions and shape can be precisely controlled as compared to bending a wire. Moreover, the cross section form of a coil segment can be square or some other shape that advantageously would resist transverse motion and so better maintain alignment. Moreover, the dimensions of the spring can be controlled so that the mechanical parameters defining the spring can be well controlled. Those parameters include, but are not limited to, the spring index, the stiffness, the oscillating frequency, the mass, the Q (the ratio of stored to dissipative energy), stresses, etc.

The alignment is a critical factor if the rod is rigid and is rigidly attached to the piston in that: 1) the rod is fixed to the piston and any transverse movement on the rod will cause the piston to mis-align in the cylinder causing friction and excessive wear; and 2) the clearance between the coil and the magnet is very small and transverse movement will produce contact causing friction and possible damage. Alternatively, the rod may be designed to be somewhat flexible, or connected to the piston using a flexible and/or easily displacing joint.

Figure 7A:
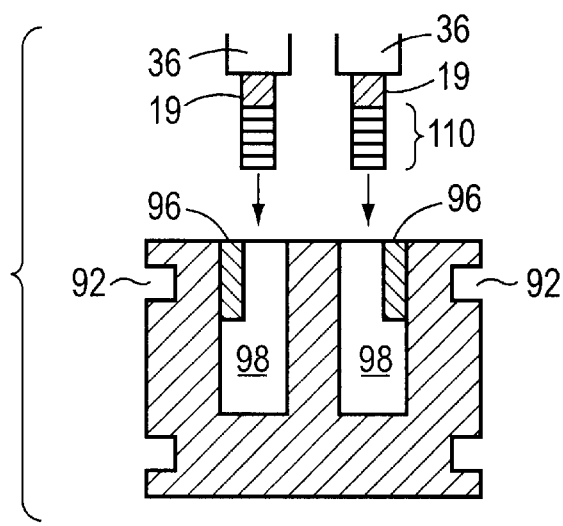
FIG. 7a is a sectioned view of the permanent magnet and coil.

Beneath the spring, and fixed to the bottom of the housing by a split ring clamp 32, is a permanent magnet assembly 42. This assembly is shown in FIG. 7a and is composed of three major pieces: an outer pole shown in cross section. The indentations 92 is are for attaching the outer pole to the housing. The magnet pole 90, in another preferred embodiment, may be made as two pieces joined together. Preferable the magnetic material is HIPERCO® 50A, and the material for the magnet 96 is samarium cobalt or alternatively neodymium-iron-boron.

Figure 7B:
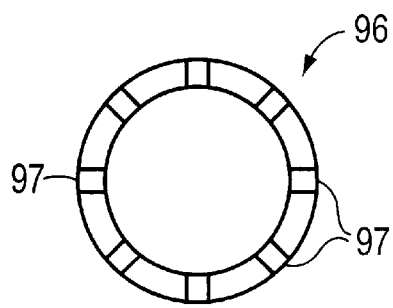
FIG. 7b is a top view of the magnet insert.

The magnet 96 in FIG. 7a is shown from a top view in FIG. 7b and is segmented with divisions 97 that allow the magnetic field to be oriented toward the center and therefore through the air gap 98 of FIG. 7a. While a single-piece magnet with a purely radial field is desired, it is difficult to make at these scales; a segmented magnet is an expedient approach for obtaining an approximately radial field.

Referring back to FIG. 7a the coil length 110 is designed to be equal to the height of the air gap 98. This has been found to provide a reasonable tradeoff between weight of the coil and energy generation, while reducing electrical dissipation within the coil. With the coil equal to the length of the magnet air gap, means are provided for positioning the coil relative to the magnet. In a preferred embodiment, a standoff 19, of FIGS. 1 and 7a, allows the coil to be positioned from the bottom of the spring 36 as desired to accomodate date the coil air gap interaction. The standoffs may be attached to the bottom of the spring by bolting, adhesives or other known methods.

Figure 8:
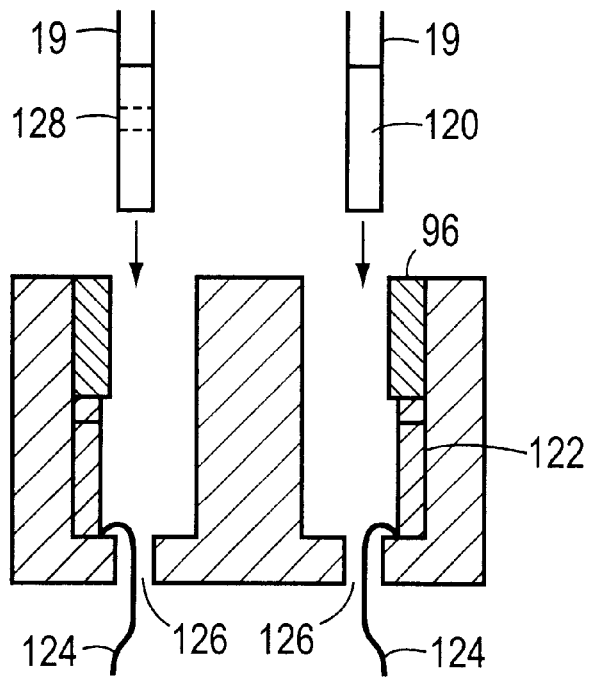
FIG. 8 is an alternative embodiment of the invention.

In another embodiment shown in FIG. 8, a shorting ring 120 inductor replaces the moving coil and a stationary induction coil 122 is placed below the magnet 96. The moving shorting ring coil has no external leads so obviating the need to get output leads from the moving coil. Power is transferred to the stationary coil via the transformer-like action of the shorting coil moving in the air gap of the magnet and inductively transferring energy to the stationary coil. Leads 124 from the stationary coil are not moving and are brought out to terminals for connecting to a load.

The coil magnet assembly is arranged with air venting holes 126 to reduce heat in the assembly. Venting holes 128 may also be provided in the moving shorting ring.

Figure 9:
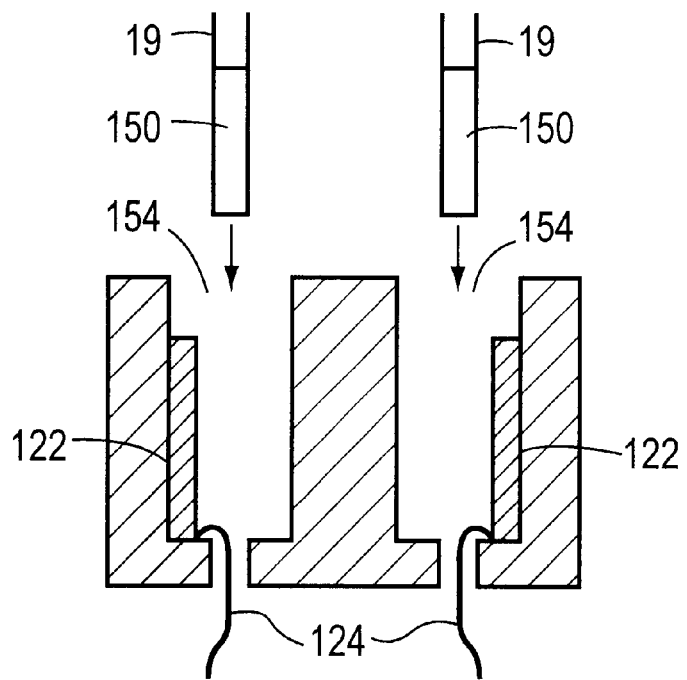
FIG. 9 is a diagram of an embodiment using a shorting coil.

FIG. 9 shows an alternate embodiment where the permanent magnet 150 is fixed to the moving end of the spring with standoffs 19. An induction coil 122 is fixed in the housing and defines an air gap 154 in which the magnet moves as the engine runs.

The engine-generator system, in a preferred embodiment, runs at about eight hundred Hertz; the stroke to bore ratio is about one; and no lubricating oil will be used. Instead, a solid film lubricant such as TiN will be used.

Fuel storage and control are needed for a practical operating engine generator. One preferred embodiment provides a running time of about one hour for the invention. Propane and dimethyl ether or similar liquids having sufficient vapor pressures to provide gaseous vaporsare preferred fuels. Such gases mix easily with air and operate over a wide range of environmental conditions while still providing fuel delivery without need of complex controls and allowing storage in the liquid state.

Figure 10:
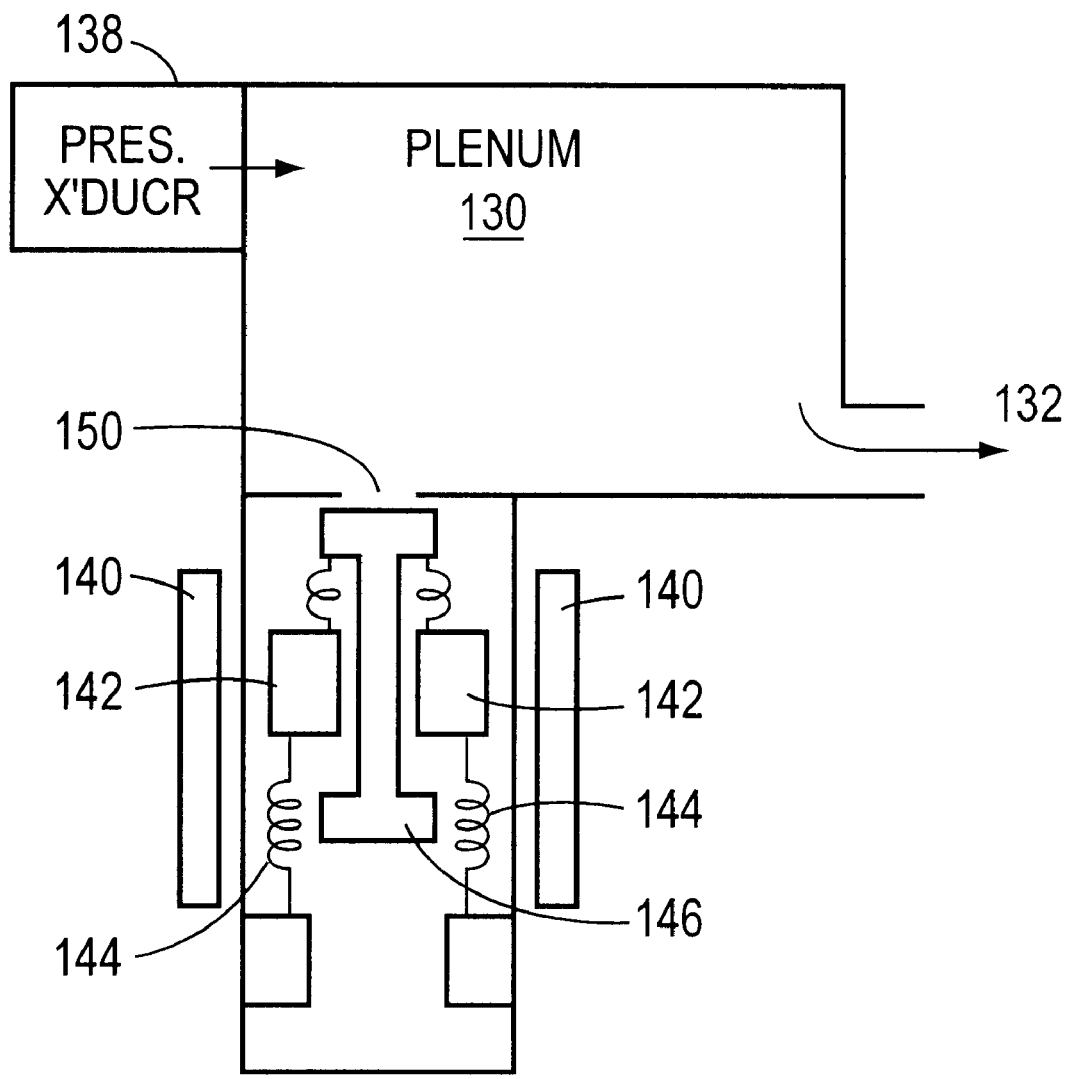
FIG. 10 is a diagram of a fuel delivery system.

One practical fuel storage delivery system is shown in FIG. 10, it comprises a flow control valve, a pressure sensor, plenum, and a fuel storage chamber. The combination of valve, pressure sensor and plenum function as a pressure regulator over a wide range of fuel delivery rates. The plenum 130 is held at essentially constant pressure during engine operation providing a constant flow 132 of vapor to the engine intake port. Operation is as follows: when the pressure transducer 138 senses a lower pressure, it send a power pulse to the solenoid 140 which drives the slide hammer 142 against the return spring 144 resulting in the valve stem 146 moving away from the opening 150 into the plenum. Fuel flows into the plenum. When the power pulse to the solenoid ends, the return spring, buffer spring, and the fuel pressure together drive the valve stem back closing the opening. The result is a charge of fuel delivered into the plenum. The system design provides for a substantially constant fuel pressure in the plenum for reliable fuel delivery to the engine. Other fuel delivery means are known in the art, particularly those used with model aircraft engines.

Starting of the engine can be accomplished by driving current into the alternator load leads, thereby using the alternator as a linear electrical motor. Power is provided to the glow plug prior to starting and removed after the engine reaches operating temperature.

Figure 11A:
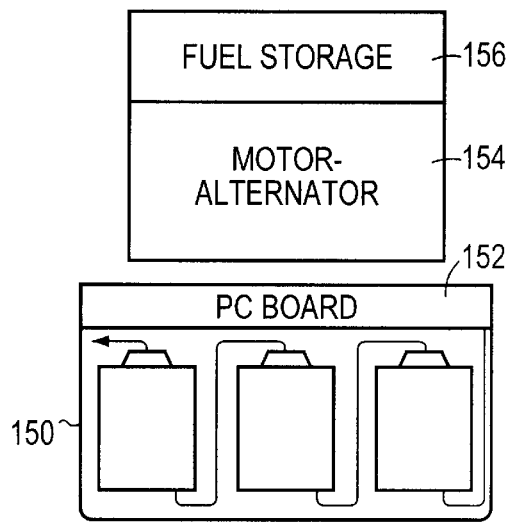
FIGS. 11a and 11b show a mechanical arrangement of the inventive integrated motor-generator battery pack.
Figure 11B:
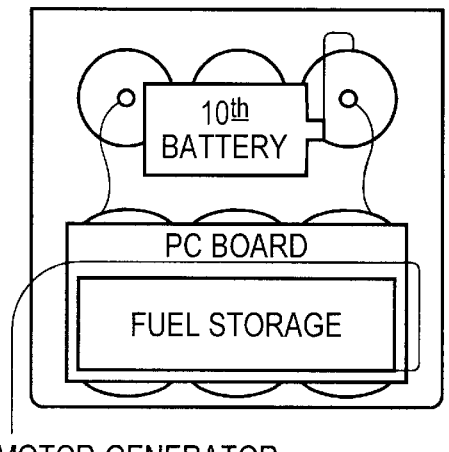

FIG. 11a shows a mechanical assembly of the invention. There is a grouping of nine nickel-cadmium batteries 150, a printed circuit board 152, the motor-generator 154 and a fuel storage assembly 156. FIG. 11b shows a top view where a tenth battery may be placed adjacent to the printed circuit boards and fuel storage tank. The width of this preferred embodiment is about three inches square for the battery assembly 150 and the height is about three inches. In another embodiment the tenth battery is not used and the fuel storage is adjacent to the motor-generator, and in this case the height would be reduced to about two and one-half inches.

Figure 12:
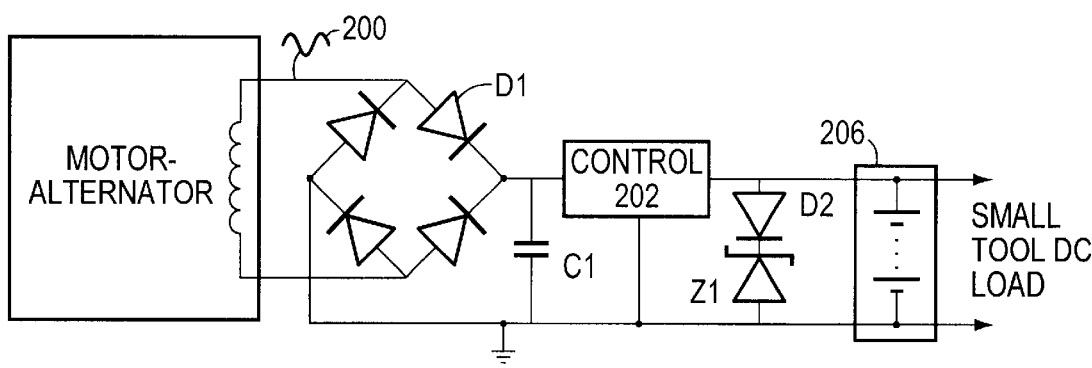
FIG. 12 is a schematic of the generator rectification and charging circuitry.

FIG. 12a shows circuitry for connecting the miniature motor-generator to the rechargeable battery pack. The AC output of the generator is an alternating waveform 200 running at about eight hundred cycles per second putting out a peak voltage of less than fifty volts, depending on the turns ratios designed into the alternator. The size of the peak is controlled to allow standard commercial electrical components to be used while meeting the operational specifications of the battery pack. The diodes D1 provide a full wave rectification, C1 is a representative filter capacitor, and the control circuitry 202 provides proper voltages and currents for charging the battery pack while providing overcharging voltage protection by the diode D2 and the Zener Z1. The control 202 circuitry and the batteries are arranged to provide proper DC currents and voltages to the small tool and personal electronic item loads. Such circuitry is well known in the art and many variants are possible (for example, in a battery-charging design guide available form Panasonic).

As is well known in the art, peak voltages and currents that occur while charging and while discharging the batteries must be within the battery specifications or battery life times (among other problems) will be impaired. As mentioned above, when the tool or electronic item is operating, such items will routinely draw peak currents that cannot be supplied by the motor/alternator. Such currents are supplied from the batteries. When the load items are disconnected or in some quiescent state the motor/alternator charges the battery. In the embodiment where the batteries 206 of FIG. 12a are replaced by capacitors 210 in FIG. 12b, the capacitors provide the peak currents to the load as did the batteries. If the load requirements (particularly the length of time that the peak power is required) can be met by the capacitors 210, the capacitors 210 can be smaller and lighter than the battery pack. The capacitors 210 will usually provide a longer lifetime than will batteries, and the capacitors will contain materials that are somewhat more benign to the environment and to the users than will batteries. Such capacitors are available, for example, from Maxwell Technologies, under the brand name "Power Cache Ultracapacitors."

Figure 13:
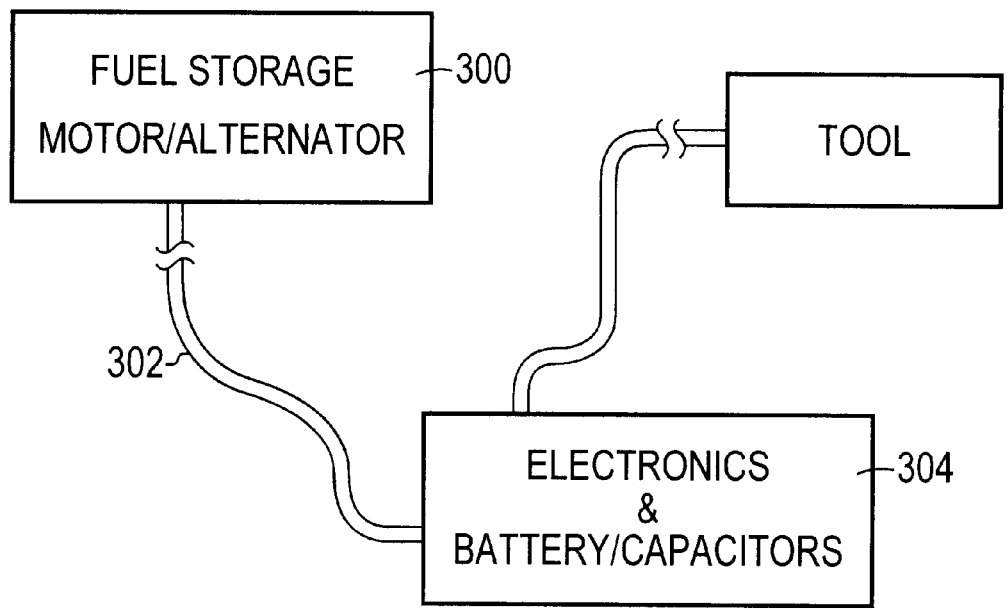
FIG. 13 is a schematic block diagram of an embodiment of the invention organized into separate modules.

FIG. 13 shows an embodiment of the present invention where the functional components are configured into modules. In this case the fuel supply and the motor/alternator 300 are one module that is connected by a cable 302 to the electronic rectification and charging circuitry 304 which is also packaged with the battery/capacitor pack. In a preferred embodiment, the battery/capacitor pack may be batteries alone or capacitors alone or a combination of both. Batteries are usually heavier but store more energy in a given volume, and conversely capacitors are lighter, they may have longer useful lifetimes, they may have volume and/or peak current and voltage capabilities that are more favorable, and they may contain fewer objectionable chemicals than batteries. The applications will dictate the use of batteries or capacitors or combinations. Such tradeoffs and operational characteristics of batteries and capacitors are well known in the art. The modular configuration of FIG. 13 allows, for example, for the motor/alternator to be placed on the floor or a desk with the electronics/batteries on the desk next to the laptop being powered. In yet another preferred embodiment, the energy storing batteries and capacitors (there will remain some small capacitors in the electronics) may be discarded. In this instance the power required for the personal item is supplied by the motor/alternator directly. In another embodiment, the batteries may be allowed to build up stored energy from the motor/alternator while the item is disconnected.

Figure 14:
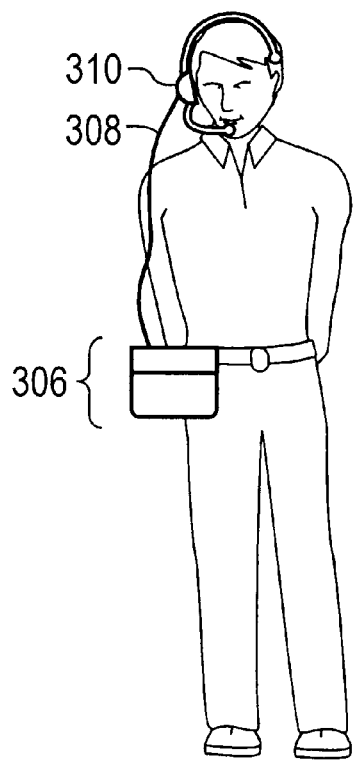
FIG. 14 is a diagram indicating practical operation of an embodiment of the invention in use and being carried on the user's person.

FIG. 14 shows an embodiment where the motor/alternator with the fuel and batteries and capacitors is arranged as a module 306 that is worn by the user on his belt, while the telephone headset 310 is worn on the user's head. Here the user's hand are completely free for other tasks.

People of ordinary skill will recognize that modifications and variations may be made to this invention without departing from the spirit and scope of the general inventive concept. This invention in its broader aspects is therefore not limited to the specific details or representative apparatuses and/or methods shown and described herein.

What is claimed is:

1. A portable power pack for powering personal items comprising:
   an internal combustion motor with an integral generator, wherein the internal combustion motor and integral generator are constructed as an inseparable single module that only functions together as a unit,
   a fuel supply constructed and arranged to supply fuel to the motor/generator,
   an electrical power output from the generator,
   an electronic circuit comprising a rectifier and controller that accepts the electrical power output and provides a DC output,
   means for storing electrical energy, and means for connecting the DC output to the means for storing electrical energy, and means for connecting the DC output and the means for storing electrical energy to a load.

2. A portable power pack for powering personal items comprising:
   a combustion motor with an integral alternator, herein referenced as a motor/alternator,
   a fuel supply constructed and arranged to supply fuel to the motor/alternator,
   an electrical power output from the motor/alternator,
   an electronic circuit that accepts the electrical power output and provides a DC output, and
   means for connecting the DC output to a load.

3. A portable power pack for powering personal items comprising:
   a combustion motor with an integral alternator, herein referenced as a motor/alternator,
   a fuel supply constructed and arranged to supply fuel to the motor/alternator,
   an electrical power output from the motor/alternator,
   an electronic circuit that accepts the electrical power output and provides a DC output,
   means for storing electrical energy, and
   means for connecting the DC output to the means for storing electrical energy.

4. The power pack as defined in claim 1 further comprising:
   a first electrical cable connecting a first module comprising the motor/alternator to a second module comprising the electronic circuit and the means for storage, and a second cable connecting the second module to an item to be powered.

5. The power pack as defined in claim 1 wherein the motor/alternator and the electrical circuit and means for storage is packaged as a module wherein the module weighs less than two kilograms.

6. The power pack as defined in the claim 1 wherein the power pack is of a size and weight suitable for being carried by a user.

7. The power pack as defined in claim 1 wherein the fuel supply is constructed as a module separated from the motor/generator, and further comprising a fuel delivery system.

8. The power pack as defined in claim 1 wherein the means for storing electrical energy comprises at least one battery.

9. The power pack as defined in claim 1 wherein the means for storing electrical energy comprises capacitors.

10. The power pack as defined in claim 1 wherein the means for storing electrical energy comprises batteries and capacitors.

11. A portable power pack for powering personal electronic items and cordless hand tools comprising:

an internal combustion motor with an integral generator, herein referenced as a motor/generator, wherein the motor/generator is constructed as an inseparable single module that only functions together as a unit, a fuel supply constructed and arranged to supply fuel to the motor/generator, an electrical power output from the generator, an electronic circuit comprising a rectifier and controller that accepts the electrical power output and provides a DC output, rechargeable batteries and capacitors connected to the DC output, wherein the rechargeable batteries and the capacitors accept and store electrical energy from the DC output, an electrical load, and a electrical conductive cable connecting the DC output and the rechargeable batteries and the capacitors to the electrical load.

12. The power pack as defined in claim 11 wherein the integrated motor/alternator is constructed as a module, and where the fuel supply is constructed as a module, and where the electrical circuit and the batteries or capacitors or both are constructed as a module, and further comprising conduit means for transporting the fuel to the integrated motor/alternator, and electrically conductive cables connecting the integrated motor/alternator to the electrical circuit and the batteries or capacitors or both, wherein the electrical circuit provides a DC output, and a second electrically conductive cable connecting the DC output to a load, and wherein each of the above modules is arranged and constructed for being carried by a user.

13. The power pack as defined in claim 12 wherein all the mentioned modules combined weigh less than two kilograms.

* * * * *